United States Patent [19]

Cote et al.

[11] Patent Number: 5,112,476

[45] Date of Patent: May 12, 1992

[54] LIQUID FILTER ASSEMBLY

[75] Inventors: Edmond H. Cote, Warren; Matthew B. Prendergast, Warwick, both of R.I.

[73] Assignee: Allied-Signal Inc., Morristown, N.J.

[21] Appl. No.: 622,885

[22] Filed: Dec. 3, 1989

[51] Int. Cl.⁵ .............................................. B01D 27/10
[52] U.S. Cl. ...................................... 210/85; 210/132; 210/316
[58] Field of Search ................... 210/94, 85, 132, 133, 210/DIG. 17, 316, 318, 435

[56] References Cited

U.S. PATENT DOCUMENTS

| | | |
|---|---|---|
| 2,253,685 | 8/1941 | Burckhalter .................. 210/133 |
| 2,770,368 | 11/1956 | Tischer ........................ 210/132 |
| 3,168,470 | 2/1965 | Rhoda ........................ 210/316 X |
| 4,349,434 | 9/1982 | Jaworski ........................ 210/94 |

Primary Examiner—Frank Spear
Attorney, Agent, or Firm—Ken C. Decker; William N. Antonis

[57] ABSTRACT

A filter assembly for filtering the lubricating oil of an internal combustion engine includes a filter base, a cover for the filter base, and a spin-on filter cartridge attached to the filter base by way of a conventional threaded mounting stud. A filter screen is clamped between the cover and filter base and is of a sufficient mesh size to trap large particles that can be examined by the human eye, thereby permitting smaller particles to pass through the screen and to be trapped in the filter cartridge. When the screen becomes clogged, a relief valve opens a bypass passage permitting all lubricating oil to flow directly into the filter cartridge.

7 Claims, 3 Drawing Sheets

LIQUID FILTER ASSEMBLY

This invention relates to a filter assembly for filtering the lubricating oil of an internal combustion engine.

In many automotive vehicles, it is desirable to be able to periodically make a visual examination of particles entrained in the engine lubricating oil if such particles are large enough to be examined by the human eye, (that is, particles having a maximum dimension of greater than 300 microns). By knowing the type and quantity of larger particles entrained in lubricating oil, the vehicle operator may be warned of incipient engine failure. However, particles to small to be examined by the human eye may still be large enough to do severe damage to the engine. Accordingly, it is desirable that all particles above a certain minimum size be removed from the engine lubricating oil. Prior art filter screens with a mesh size small enough to capture all of the particles which may damage the engine clog very quickly, and provide no additional meaningful information to the vehicle operator than do wire mesh screens that capture only relatively large particles. Accordingly, prior art mesh screen filters with a relatively small mesh size sufficient to capture all the particles that might injure the vehicle engine actually may damage the engine because these filters plug so quickly.

The present invention relates to a filter assembly that is preferably mounted somewhere within the engine compartment but apart from the engine. Separate lubricating lines are used to communicate engine lubricating oil to and from the filter assembly. The filter assembly includes a mounting surface upon which a conventional, spin-on, lubricating oil filter is mounted. A flow path is defined through a wire mesh screen within the filter assembly so that lubricating oil is communicated first through the wire mesh screen and then through the conventional lubricating oil spin-on filter. The wire mesh screen is a relatively open screen, and captures only those particles large enough to be examined by the human eye. Accordingly, smaller particles which are still large enough to damage the engine are permitted to pass through screen, but are then captured in the conventional spin-on lube oil filter which is attached to the filter mount downstream of the screen. If the screen becomes plugged, a bypass passage opens to permit flow of lubricating oil around the screen. In this case, all particles, both large and small, are removed by the conventional spin-on lubricating oil filter. Although these large particles will not be retained on the screen for examination, they nevertheless will be removed from the lubricating oil, and the screen will retain a sufficient number of large particles before being plugged to permit meaningful information to be learned by the vehicle operator from examining the particles.

These and other advantages of the present invention will become apparent from the following description, with reference to the accompanying drawings, in which.

Figure 1:
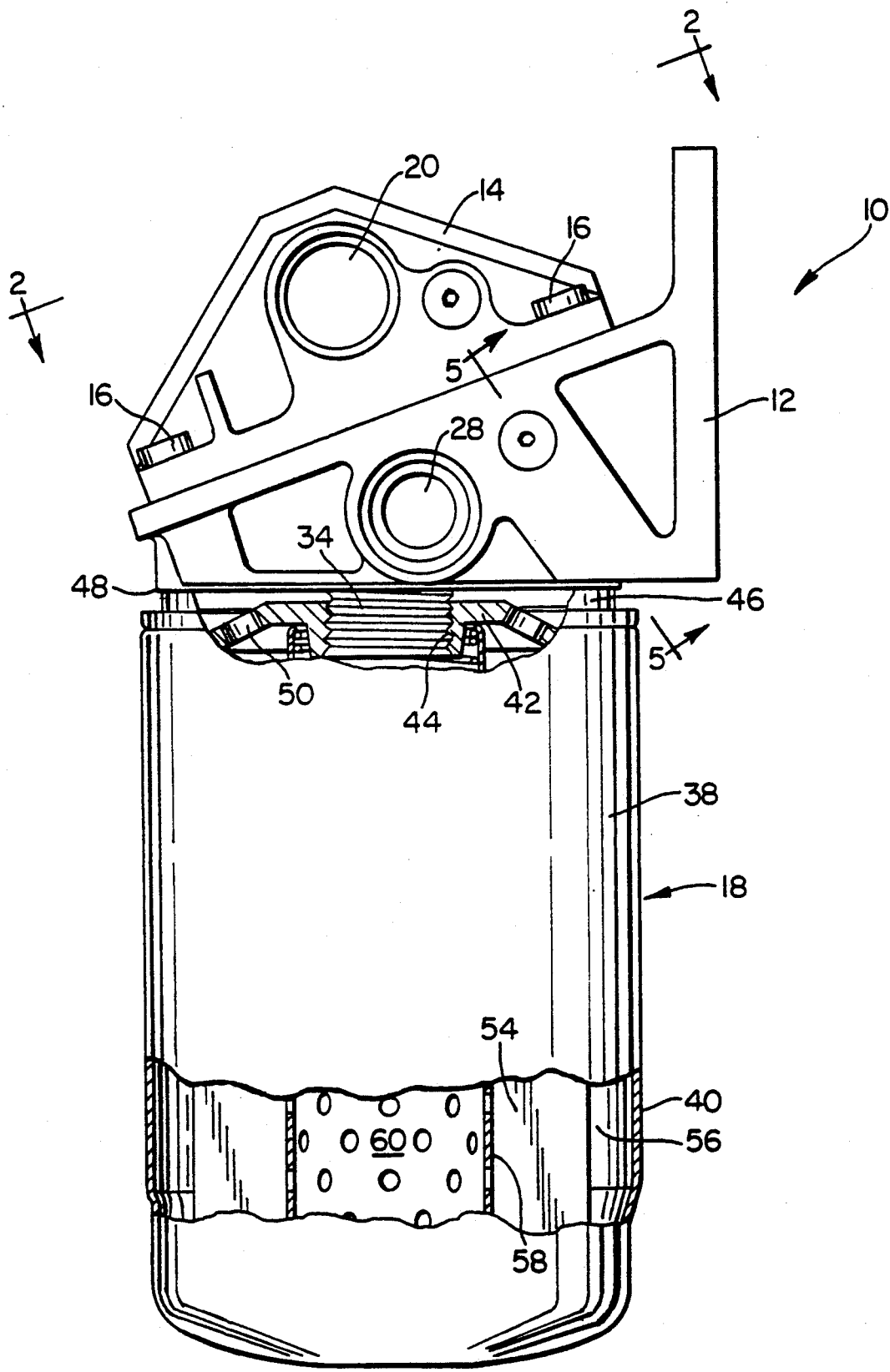
FIG. 1 is a side elevational view, partly in section, of a filter assembly made pursuant to the teachings of the present invention.
Figure 2:
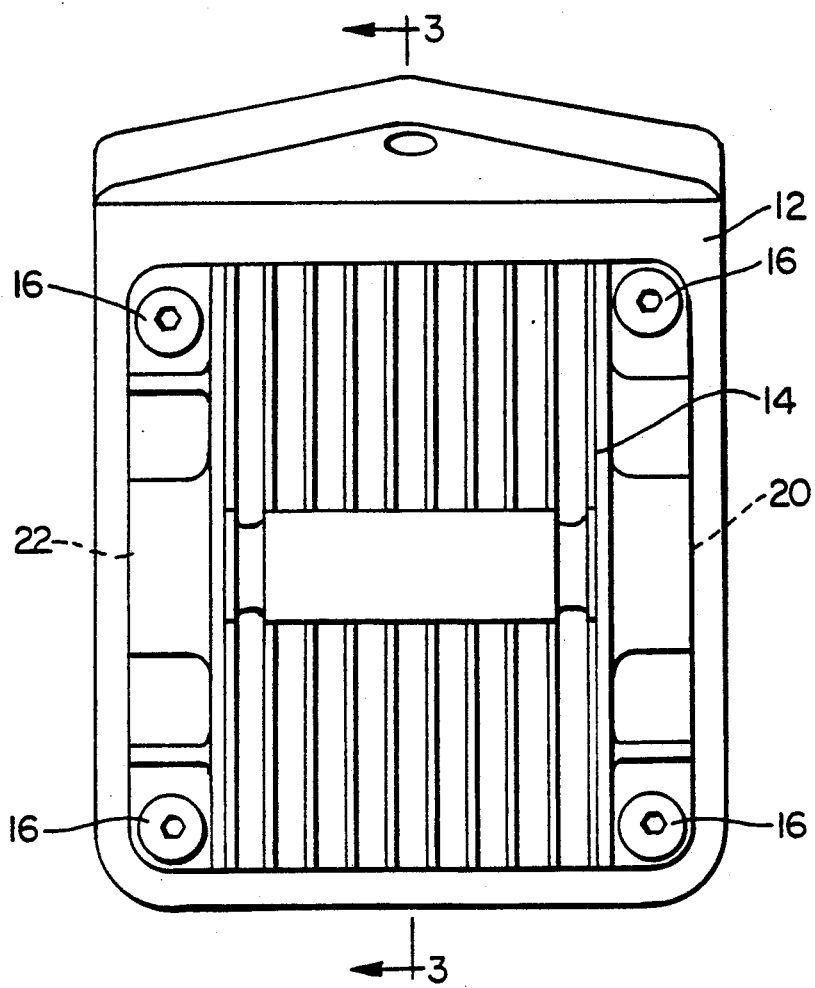
FIG. 2 is a top plan view taken substantially along lines 2—2 of FIG. 1.

Referring now to the drawings, a filter assembly generally indicated by the numeral 10 includes a base 12, a removable cover 14 mounted on the base 12 by conventional removable fasteners 16, and a conventional spin-on filter cartridge 18. The cover 14 is provided with a pair of inlet openings 20, 22. The oil inlet line (not shown) which communicates oil from the vehicle engine (not shown) to the filter assembly 10 is connected to either of the inlet openings 20, 22, and the other inlet opening is plugged. Since the inlet line can be connected from either side of the filter assembly 10, routing of the inlet line within the engine compartment is simplified. Each of the inlet openings 20, 22 communicate with an inlet chamber 24 defined within the cover 14. The base 12 includes a projecting mounting bracket 26 for attachment of the base to a portion of the vehicle body within the engine compartment. Base 16 also includes a pair of outlet openings 28, 30. The outlet line, which returns filtered lubricating oil from the filter assembly 10 back to the vehicle engine (not shown) is connected to either of the outlet openings 28, 30 in a conventional manner, and the other outlet opening is plugged. Each of the outlet openings 28, 30 communicate with an outlet chamber 32 which communicates with the filter cartridge 18 through a hollow, threaded mounting stud 34 which projects from the base 12. Stud 34 defines a passage 36 to allow communication to the filter cartridge 18 as will hereinafter be described.

Filter cartridge 18 includes a housing 38 comprising a cup-shaped portion 40 made of relative thin metal and a tapping plate 42 of thicker metal which closes the open end of the cup-shaped portion 40 in manner well know to those skilled in the art. Tapping plate 42 defines a threaded aperture 44 which threadly engages the threads on the stud 34 when the filter cartridge 18 is installed on the base 18 by "spinning on" the filter cartridge 18 by engaging the threads on the opening 44 with the threads on the stud and then rotating the filter cartridge 18 relative to the base 12. The tapping plate carries a circumferentially extending seal 46 which sealingly engages circumferentially extending sealing surface 48 defined on the base 12 to assure a fluid tight engagement between the filter cartridge 18 and the base 12.

The tapping plate 42 is also provided with circumferentially spaced apertures 50 which communicate with the inlet chamber 24 defined within the cover 14 through passages 52 defined within the base 12. Passages 50 communicate lubricating oil from the inlet chamber into the cartridge 18. Filter cartridge 18 further includes a conventional circumferentially extending array of pleated filtering media generally indicated by the numeral 54, the outer tips of which cooperate with the cup-shaped portion 40 of housing 38 to define an annular inlet chamber 56 therebetween. Inlet chamber 56 communicates with the apertures 50. Accordingly, lubricating oil communicated through apertures 50 into chamber 56 communicates through the filtering media 54 and through a perforated supporting metal center tube 58 into chamber 60 which is communicated to the outlet chamber 32 through the passage 36 defined within mounting stud 34. Accordingly, fluid communicated into the filter cartridge 18 is filtered by the filtering media 54 before being communicated to the outlet chamber 32 into one of the outlet opening 28 or 30. Accordingly, the filter cartridge 38 filters lubricating oil in substantially the same way that conventional spin-on filter elements filter oil when attached to a filter mounting surface on an internal combustion engine.

Figure 3:
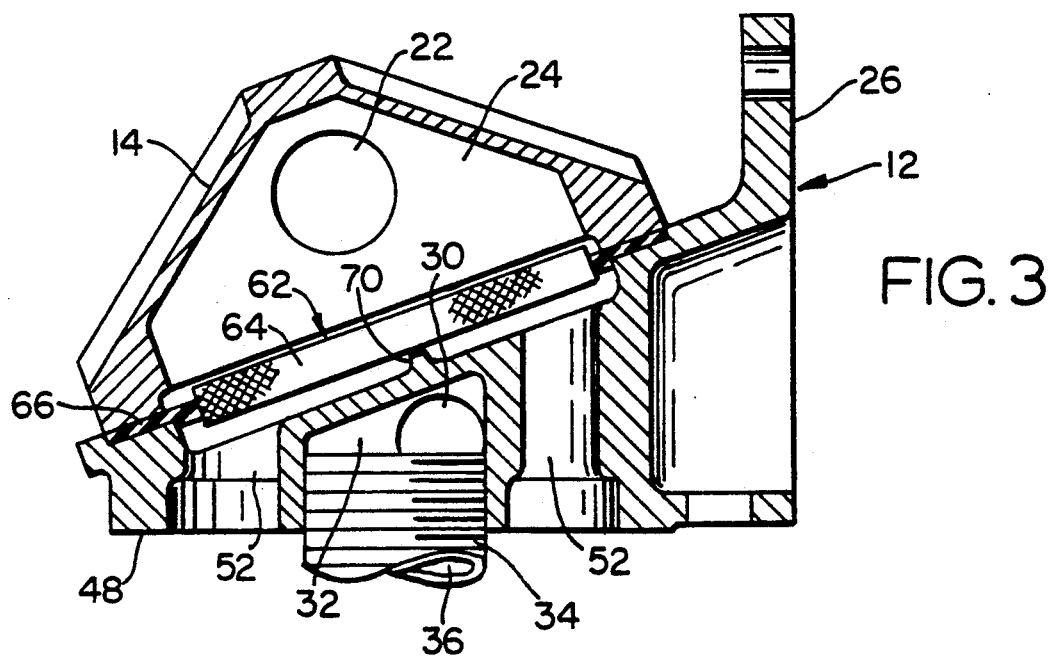
FIG. 3 is a cross-sectional view of the filter base portion of the filter assembly according to the present invention taken substantially along lines 3—3 of FIG. 2.
Figure 4:
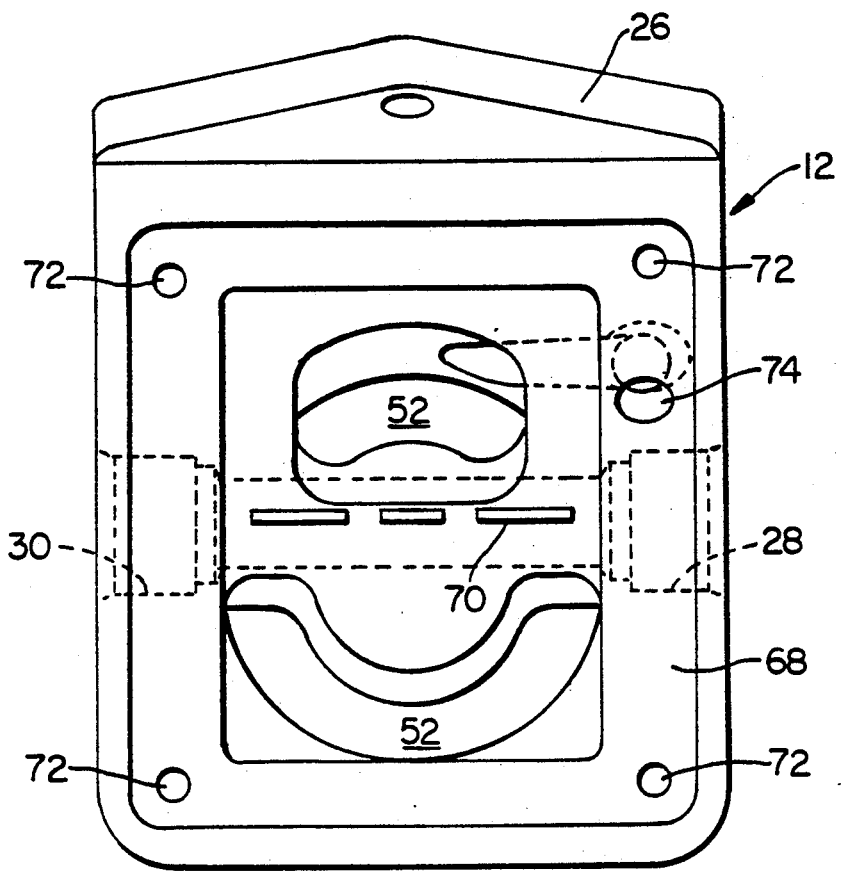
FIG. 4 is a top plan view of the filter base portion of the filter assembly illustrated with cover and the filter screen removed.

A screen generally indicated by the numeral 62 is mounted in the inlet chamber 24 such that all of the lubricating oil passing through the inlet chamber 24 is normally communicated through the wire mesh screen 62. The screen 62 consists of a series of longitudinally extending corrugations 64 of a screening material having a mesh size such that all particles entrained within the lubricating oil communicated through the filter assembly 10 which can be examined by the human eye (that is, all particles having a maximum dimension of at least 300 microns) will be entrained on the upper surface (viewing FIG. 3) of the screen 62, while smaller particles will pass through the screen 62. A gasket made of rubber or other suitable sealing material as generally indicated by the numeral 66 is bonded to the sides of the screen 62 and completely surrounds the latter. The gasket 66 rests on a parametrically extending mounting surface generally indicated by the numeral 68 (FIG. 4) to support the screen 64 within the inlet chamber 24. The base 16 further includes a projecting portion 70 which projects against the lower surface (viewing FIG. 3) of the screen 62 to inhibit deflection of the latter.

Figure 5:
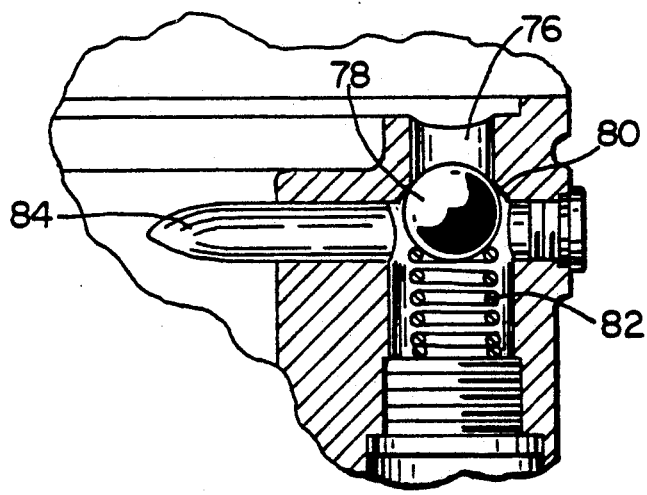
FIG. 5 is an enlarged, fragmentary, cross-sectional view taken substantially along lines 5—5 of FIG. 1.

The cover 14 is clamped against the upper side (viewing FIG. 3) of the gasket 66 by the fasteners 16 which pass through openings (not shown) in the gasket 60 to engage corresponding openings 72 in the mounting surface 68 to thereby compress the gasket 66 against the mounting surface 68 when the cover is installed on the base 16, thereby assuring a fluid tight seal between the cover and the base while retaining the screen 62 in its proper position to remove large particles from lubricating oil communicated through the openings 20 or 22 and into the passages 52. An additional opening 74 is provided in the mounting surface 68 which communicates with a passage 76 (FIG. 5) in the base 16. A relief valve 78 is loaded against a valve seat 80 defined within the passage 76 by a spring 82 such that when the pressure level in the inlet chamber 24 exceeds a predetermined level, the ball valve 78 is forced away from its seat 80 to permit lubricating oil to pass directly from inlet chamber 24 directly to the passages 52 through side channel 84, thereby completely bypassing the screen 62.

During normal operation of the filter assembly 12, lubricating oil is communicated into inlet chamber 24 and passes through the screen 64, and is thereafter communicated through the passages 52 and apertures 50 into the annular inlet chamber 56 of the filter cartridge 18. Lubricating oil then passes through the filtering media 54 and into outlet chamber 60, where it is communicated back into the filter base 12 through the passage 36 defined within mounting stud 34 and into inlet chamber 32.

As discussed above, the screen 62 has a mesh size sufficient to trap particles that may be seen by the human eye. Accordingly, the vehicle operator may determine the nature and size of the visible particles being expelled from the engine by simply removing the cover 14 by removing the remoaable fasteners 16. The screen 62 can then be removed from the assembly. The particles can then be knocked off the screen and the screen and cover reinstalled. In this way, the vehicle operator can determine if visible particles are being expelled by the engine without disturbing the rest of the lubrication system.

Since the filtering media 54 is conventional, it is designed to trap all particles, both large and small, that are of sufficient size to damage engine components. Accordingly, the filtering media 54 is able to trap fine particles which are invisible to the human eye and which readily pass through the screen 62. However, since the filtering media 54 is conventionally used in filters used on engines not provided with a screen 62, the filtering media 54 can also remove large particles which would normally be trapped by the screen 62. Since the screen 62 is relatively small and has relatively low capacity, it can clog quickly if the vehicle engine is expelling a quantity of particles large enough to be trapped by the screen 62. When this occurs, pressure rapidly increases in the inlet chamber 24, such that the fluid pressure in inlet chamber 24 is sufficiently great to overcome the force of spring 82 and thereby cracks open the valve 78 from its seat 80, thereby permitting lubricating oil to flow around the screen 62 and directly enter the passages 52 which communicate lubricate oil through apertures 50 into the inlet chamber 56. Accordingly, the media 54 is then used to capture both large and small particles, thereby assuring the lubricating oil communicated back to the engine is free of all damaging particles.

The filter cartridge 18 is changed at regular service intervals in the conventional manner by simply "spinning off" the filter cartridge 18 by rotating it relative to the base 12, thereby unscrewing the filter cartridge 18 from the mounting stud 34. A new filter cartridge is then installed. In this way, the connections between the engine and the filter base 12 are not disturbed, so that filter cartridge 18 can be changed quickly and easily in the normal manner.

We claim:

1. Filter assembly for filtering the lubricating oils of an internal combustion engine comprising a housing having an inlet and an outlet and defining a flowpath for communicating lubricating oils between the inlet and the outlet, a screen supported within said housing in said flowpath for removing relatively large particles from lubricating oil communicated through said flowpath and passing through said screen, said relatively large particles being retained on said screen, said housing including removable cover means for covering said screen and for permitting examination of said screen upon removal of said cover, said screen permitting particles smaller than said relatively large particles to pass through said screen, said housing defining a bypass passage communicating said inlet directly to said filtering media bypassing said screen, and a relief valve in said bypass passage opening to permit flow of lubrication oil carrying said relatively large particles and smaller particles through said bypass passage when the pressure differential across said screen exceeds a predetermined level, and a filtering media separate from said screen between said screen and said outlet, said filtering media including oil permeable means for removing particles from said lubricating oil not removed by said screen including said relatively large particles carried by said lubricating oil through said bypass passage.

2. Filter assembly as claimed in claim 1, wherein said relatively large particles retained on said screen are large enough to be seen by the human eye.

3. Filter assembly as claimed in claim 1, wherein said relatively large particles have a maximum dimension of greater than about 300 microns.

4. Filter assembly as claimed in claim 1, wherein said housing includes a base and a cartridge housing removably secured to said base, said base including a cartridge housing mounting surface for engagement with said cartridge housing, said cartridge housing defining a chamber within said cartridge housing in which said filtering media is mounted.

5. Filter assembly as claimed in claim 1, wherein said housing includes a base having a screen supporting surface for supporting said screen and a cartridge housing removably secured to said base, said base including a cartridge housing mounting surface for engagement with said cartridge housing, said cartridge housing defining a chamber within said cartridge housing in which said filtering media is mounted.

6. Filter assembly as claimed in claim 5, wherein said cover includes a screen engaging surface cooperating with said screen supporting surface to clamp said screen therebetween to permit inspection and removal of said screen upon removal of said cover.

7. Filter assembly as claimed in claim 6, wherein said cartridge housing mounting surface includes a threaded stud extending therefrom and said cartridge housing includes a threaded opening for engagement with said stud, said flowpath extending through said opening and said stud, said outlet being defined in said base.

* * * * *

UNITED STATES PATENT AND TRADEMARK OFFICE
CERTIFICATE OF CORRECTION

PATENT NO. : 5,112,476
DATED : May 12, 1992
INVENTOR(S) : Edmond H. Cote & Matthew B. Prendergast It is certified that error appears in the above-identified patent and that said Letters Patent is hereby corrected as shown below:

On The Title Page, Item [22]

should be Filed: Dec. 3, 1990

Signed and Sealed this

Eighteenth Day of August, 1992

*Attest:*

DOUGLAS B. COMER

*Attesting Officer*     *Acting Commissioner of Patents and Trademarks*